United States Patent
Pies

[11] 3,916,821
[45] Nov. 4, 1975

[54] MAGNETIC MARKER ASSEMBLY

[76] Inventor: Othmar W. Pies, 200 W. Galbraith Road, Cincinnati, Ohio 45215

[22] Filed: June 19, 1972

[21] Appl. No.: 264,179

[52] U.S. Cl. ............................... 116/114 R; 52/103
[51] Int. Cl.² .................. G01C 15/06; G01C 15/04
[58] Field of Search ........ 116/114 R, 132, 63 P, 63; 52/103, 104

[56] References Cited
UNITED STATES PATENTS
1,004,188  9/1911  Olds .................................. 52/103
2,527,681 10/1950  Lewis, Jr. et al. ................. 52/103
3,205,626  9/1965  Attenberger ..................... 52/103

Primary Examiner—S. Clement Swisher
Assistant Examiner—Denis E. Corr
Attorney, Agent, or Firm—James W. Pearce; Roy F. Schaeperklaus

[57] ABSTRACT

A marker assembly including an elongated upright iron stake and a marker member mounted on an upper portion of the stake. The marker member includes a permanent magnet inside a housing. An elongated upright socket in the housing receives the upper portion of the stake with the magnet being exposed in the socket and engaging an upper end of the stake.

6 Claims, 6 Drawing Figures

MAGNETIC MARKER ASSEMBLY

This invention relates to a device for marking geographical points such as points on boundary lines and for marking the location of buried objects and the like.

An object of this invention is to provide a marker assembly which can readily be buried in the ground and which can be located when desired, even when it has been covered by the ground.

A further object of this invention is to provide such a marker assembly which includes a magnet which can be located with a tool such as the dipping needle shown in my U.S. Pat. No. 2,775,736.

Briefly, this invention provides a marker assembly which includes a stake of iron or other magnetically responsive metal, which is driven in the ground at a location to be marked. A marker member is mounted on the upper end of the stake. The marker member includes a housing of plastic resin material or the like having a socket in which the upper end of the stake is received. A magnet is mounted in the marker member at the inner end of the socket with a face of the magnet exposed to the socket so that the upper end of the stake engages the magnet. The magnet holds the marker member on the stake and the stake adds to and reinforces the magnetic flux set up by the magnet so that when a dipping needle is brought into proximity with the marker assembly, there is a strong magnetic response. The walls of the socket can be constructed to engage and grip the stake to assist in holding the stake and the marker member in assembled relation.

The above and other objects and features of the invention will be apparent to those skilled in the art to which this invention pertains from the following detailed description and the drawings, in which.

In the following detailed description and the drawing, like reference characters indicate like parts.

Figure 1:
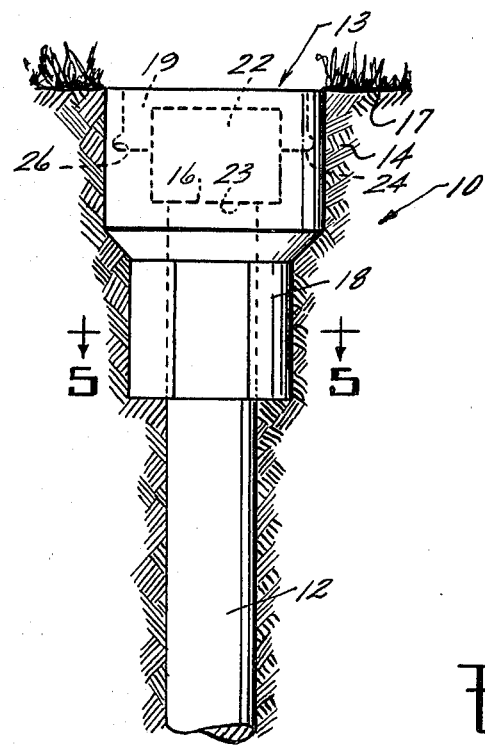
FIG. 1 is a view in side elevation of a marker assembly constructed in accordance with an embodiment of this invention, the assembly being shown mounted in the ground.
Figure 2:
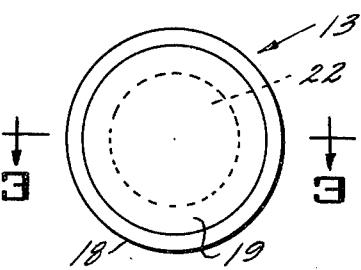
FIG. 2 is a top plan view of a marker member of the assembly shown in FIG. 1.

In FIG. 1 is shown a marker assembly 10 constructed in accordance with an embodiment of this invention. The assembly 10 includes a stake 12 and a marker member 13. The stake 12 is formed of iron or other magnetically responsive metal. The stake is driven into the ground 14 until an upper end 16 of the stake is a little distance below the surface 17 of the ground. The ground can be cleared away around the head of the stake 12 sufficiently to permit the marker member 13 to be mounted on the head of the stake 12. When the marker member is in place, the ground can be filled in around the marker member.

Figure 3:
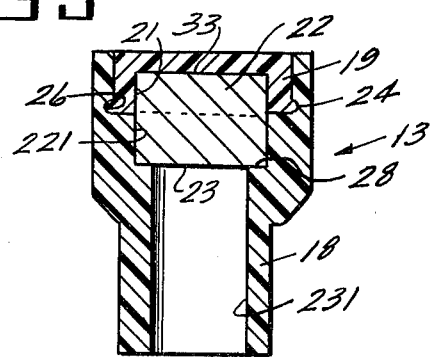
FIG. 3 is a view in section taken on the line 3—3 in FIG. 2.

The marker member 13 includes a main body 18, which is tubular, and a plug 19 of generally inverted cup shape. The body 18 and plug 19 of the marker member are molded of a strong durable plastic resinous dielectric material, such as polyethylene, which is not magnetically responsive. A hollow or socket 21 (FIG. 3) in the plug portion 19 receives an upper portion of a permanent magnet 22 with a lower portion of the magnet extending into a counterbore 221 in the main body 18 and with the major portion of a lower face 23 of the magnet exposed inside a bore 231 in the main body 18.

An annular flange 24 on the plug 19 surrounding the socket 21 is received in an annular socket 26 in the lower portion 18 surrounding and coaxial with the center bore 231 thereof to hold the body 18 and the plug 19 of the marker member in assembled relation with the magnet 22 held in the socket 21 and the counterbore 221 by engagement with a shoulder 28 of the main body.

Figure 4:
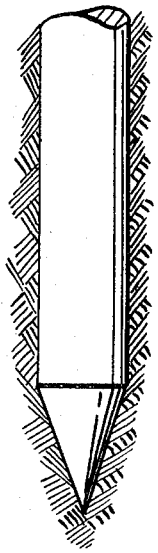
FIG. 4 is a bottom plan view of the marker member.
Figure 4:
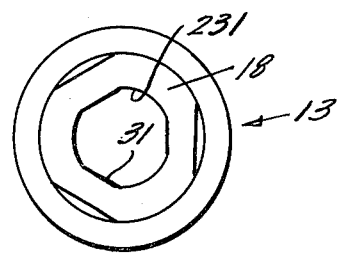
Figure 5:
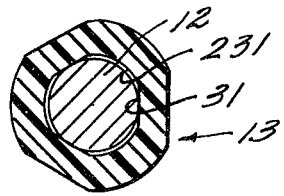
FIG. 5 is a view in section taken on the line 5—5 in FIG. 1.
Figure 6:
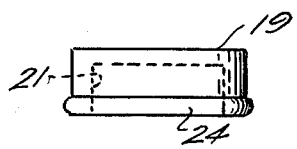
FIG. 6 is a view in side elevation of a plug portion of the marker member.

The upper portion of the stake 12 (FIG. 1) is received in the bore 231 with the bore 231 forming an elongated socket for receiving the upper portion of the stake 12 and with the upper end face 16 of the stake 12 engaging flatwise against the lower face 23 of the magnet 22 so that the stake 12 forms with the magnet 22 an assembled magnetic system in which the stake reinforces and extends the magnetic field of the magnet 22. Sides of the central bore 231 are provided with flat faces 31 (FIGS. 4 and 5) which are parallel to the axis of the bore 231 and engage and grip sides of the upper portion of the stake 12 to hold the marker member 13 on the stake. Magnetic attraction between the magnet 22 and the stake 12 also holds the marker member 13 on the upper end portion of the stake 12.

The magnet 22 is mounted in the marker member with the axis thereof upright. Preferably, the magnet is so mounted that the magnetism of the earth adds to the magnetism of the magnet 22 in the hemisphere in which it is to be used. When the assembly is used in the southern hemisphere, the magnet can be reversed from the position it has in the northern hemisphere.

The marker assembly can be located by means of a dipping needle or the like even if the assembly becomes covered by the ground.

The marker assembly illustrated in the drawings and described above is subject to structural variation without departing from the spirit and scope of the appended claims.

Having described my invention, what I claim as new and desire to secure by letters patent is:

1. A marker assembly which comprises an elongated upright driveable stake of magnetic responsive material and a marker member mounted on an upper portion of the stake, the marker member including a permanent magnet and a housing surrounding the magnet, there being an elongated upright socket in the housing receiving the upper portion of the stake, the magnet being exposed in the socket and engaging an upper end of the stake.

2. A marker assembly as in claim 1 wherein walls of the socket engage and grip the upper end portion of the stake.

3. A marker assembly as in claim 1 wherein the housing is formed of dielectric material.

4. A marker assembly as in claim 1 wherein the housing includes a tubular main body having the socket therein and a counterbore at the socket, the magnet is received in the counterbore, there being an annular shoulder on the main body engaging the magnet, and a plug is mounted in the counterbore and engages the magnet to hold the magnet in the counterbore.

5. A magnetic marker member which includes a permanent magnet and a housing surrounding the magnet, there being an elongated upright socket in the housing for receiving the upper portion of a stake, the magnet being exposed in the socket and engageable with an upper end of the stake.

6. A marker member as in claim 5 wherein the housing includes a tubular main body having the socket therein and a counterbore at the socket, the magnet is received in the counterbore, there being an annular shoulder on the main body engaging the magnet, and a plug is mounted in the counterbore engaging the magnet to hold the magnet in the counterbore.

* * * * *